United States Patent

Edgar et al.

(10) Patent No.: US 9,591,163 B2
(45) Date of Patent: Mar. 7, 2017

(54) MARKING APPARATUS USING A SCRIPTING LANGUAGE

(75) Inventors: Cameron Robert Edgar, Huntingdon (GB); Steven Geoffrey Luke, Huntingdon (GB)

(73) Assignee: Domino Printing Sciences PLC (GB)

( * ) Notice: Subject to any disclaimer, the term of this patent is extended or adjusted under 35 U.S.C. 154(b) by 78 days.

(21) Appl. No.: 13/634,947

(22) PCT Filed: Mar. 10, 2011

(86) PCT No.: PCT/GB2011/000341
§ 371 (c)(1),
(2), (4) Date: Sep. 14, 2012

(87) PCT Pub. No.: WO2011/114093
PCT Pub. Date: Sep. 22, 2011

(65) Prior Publication Data
US 2013/0003102 A1    Jan. 3, 2013

(30) Foreign Application Priority Data
Mar. 16, 2010    (GB) .................................. 1004369.3

(51) Int. Cl.
| | |
|---|---|
| G06F 3/12 | (2006.01) |
| H04N 1/00 | (2006.01) |
| G06F 9/445 | (2006.01) |
| G06F 9/455 | (2006.01) |
| G06K 1/12 | (2006.01) |
| B41M 1/28 | (2006.01) |
| B41M 1/40 | (2006.01) |

(52) U.S. Cl.
CPC ..... *H04N 1/00965* (2013.01); *G06F 9/44505* (2013.01); *G06F 9/45512* (2013.01); *H04N 1/00323* (2013.01); *H04N 1/00938* (2013.01); *H04N 1/00973* (2013.01); *H04N 2201/0082* (2013.01)

(58) Field of Classification Search
CPC .... G06F 3/1208; G06F 3/1256; G06F 17/212; G06F 3/1243; H04N 1/0044; H04N 1/00938; G06K 1/121; B41M 1/26; B41M 1/40
USPC .......... 101/35; 715/255, 256; 358/1.15, 1.18
See application file for complete search history.

(56) References Cited

U.S. PATENT DOCUMENTS

| | | | |
|---|---|---|---|
| 6,039,426 A | * 3/2000 | Dobbs ........................ | B41J 2/21 347/19 |
| 6,193,054 B1 | * 2/2001 | Henson et al. ............... | 198/783 |
| 6,381,441 B1 | * 4/2002 | Byeon ..................... | B65H 5/34 271/265.02 |
| 7,620,948 B1 | 11/2009 | Rowe et al. | |
| 2003/0057280 A1 | * 3/2003 | Mandile ........................ | 235/454 |
| 2003/0140804 A1 | 7/2003 | Korthauer | |

(Continued)

FOREIGN PATENT DOCUMENTS

WO    2009004328    1/2009

*Primary Examiner* — Eric A Rust
(74) *Attorney, Agent, or Firm* — Price Heneveld LLP

(57) ABSTRACT

A marking apparatus for applying a message to an article, the apparatus comprising: a processor arranged to generate a message for application to an article and to control the operation of the marking apparatus by, at least in part, executing an operational behavior script formed using a scripting language; and a printing arrangement for applying a generated message to an article.

36 Claims, 4 Drawing Sheets

(56) References Cited

U.S. PATENT DOCUMENTS

| | | |
|---|---|---|
| 2003/0189727 A1* | 10/2003 | Kloosterman et al. ...... 358/1.18 |
| 2005/0030580 A1* | 2/2005 | Moroi .................. G06F 3/1204 358/1.15 |
| 2005/0230478 A1 | 10/2005 | Chapman et al. |
| 2005/0230479 A1 | 10/2005 | Chapman et al. |
| 2007/0204029 A1* | 8/2007 | Igarashi ............ H04L 29/12009 709/223 |
| 2008/0250385 A1 | 10/2008 | Sanchez |
| 2009/0089597 A1* | 4/2009 | Sugita ................ G03G 15/5004 713/320 |
| 2010/0058321 A1 | 3/2010 | Anderson et al. |
| 2011/0007346 A1* | 1/2011 | Bush, III ............. G06F 3/1219 358/1.15 |

\* cited by examiner

MARKING APPARATUS USING A SCRIPTING LANGUAGE

FIELD OF THE INVENTION

The present invention relates to a marking apparatus and a method of using a marking apparatus.

BACKGROUND OF THE INVENTION

Industrial marking and coding equipment is a well-known art. Articles (or products or items) carried on a moving line are displaced past a station at which a mark is applied thereto by the marking and coding equipment. Typically the mark is applied by an inkjet process of some type (such as continuous inkjet printing) or by a laser (such as laser printing).

The mark will be referred to hereinafter as a message. As will be well known a message may comprise a string of characters or symbols, typically numbers, letters or a combination of letters and numbers, although other symbols may be used too. Further, a message may comprise both fixed (predetermined) data and variable data. By way of example, a typical message is of the format: "BEST BEFORE 10 MAY 2007". The "BEST BEFORE" part of the message is fixed but the "10 MAY 2007" part will vary according to the date on which the message is applied to the article.

The above-described industrial marking and coding equipment is often referred to by the term "primary coding printer". Additionally, such industrial and coding equipment is often referred to by the term "product-identification printer", although it will be appreciated that the mark/message applied by a product-identification printer to an article need not be a mark/message that actually identifies that article but may, as described above, be any other type of message (such as a message indicating a date by which the article should be used or consumed).

Industrial marking and coding equipment is used in a vast range of different marking applications depending on the user base, environment and market sector. These applications can vary in terms of defining the set of rules or criteria for when to print/mark or general behavioural operation of the coding equipment. This variation in behaviour is typically influenced by physical and functional parameters including the amount of discrete I/O (input/output), the functionality mapped to this I/O, data rates, trigger and synchronisation mechanisms, signal validation/verification and timing etc.

Typically these types of non-standard behavioural operations tend to evolve over time and are managed as "special" hard-wired deployments. As a result, it is often the case that these deployments become out of sync with the mainstream development and migration paths become a limiting factor. In addition, users are often then faced with difficulties in replacing apparatus in the event of a failure or "hot-swapping" of their apparatus.

SUMMARY OF THE INVENTION

It is therefore an object of the invention to provide more flexible and dynamic behavioural configuration for marking and coding apparatus. The invention makes use of operational behaviour scripts to configure the operational behaviour of a printer. The ability to express different behavioural operations in a dynamic, data driven way through the provision of a relatively small number of key building blocks (rather than developing hard-wired 'specialised' product functionality) provides a large level of flexibility in the deployment of coding and marking apparatus. It provides a means for late stage customisation that allows specific tailoring for customers and ensures that the core product and its functionality remains consistent (which means it will remain as a much more stable, reliable and upgradeable platform).

According to an aspect of the invention, there is provided a marking apparatus for applying a message to an article, the apparatus comprising: a processor arranged to generate a message for application to an article and to control the operation of the marking apparatus by, at least in part, executing an operational behaviour script formed using a scripting language; and a printing arrangement for applying a generated message to an article.

Execution of the operational behaviour script by the processor may cause the processor to control the printing arrangement.

The processor may be arranged to provide default functionality to the apparatus and execution of the operational behaviour script by the processor may cause the processor to provide user-configured functionality to the apparatus.

Execution of the operational behaviour script by the processor may control, at least in part, detection of an article to which a message is to be applied.

Execution of the operational behaviour script by the processor may control, at least in part, when the processor generates a message for application to an article.

Execution of the operational behaviour script by the processor may control, at least in part, when the processor generates an alert or a warning.

Execution of the operational behaviour script by the processor may control, at least in part, determining than an event or an action has timed-out.

Execution of the operational behaviour script by the processor may cause the processor to provide data as an output from the apparatus.

Execution of the operational behaviour script by the processor may cause the processor to determine whether a sequence of events has been carried out in a correct order or with correct timing and to take an action in dependence on whether or not the sequence of events has been carried out in the correct order or with the correct timing.

Execution of the operational behaviour script by the processor may cause the processor to detect whether or not a specific event has occurred and to take an action in dependence upon whether or not the specific event has occurred.

Execution of the operational behaviour script by the processor may cause the processor to determine a rate at which specific events occur and to take an action in dependence on the determined rate.

The apparatus may comprise a clock and execution of the operational behaviour script by the processor may cause the processor to use an output of the clock to perform a time-based action or calculation.

The apparatus may comprise a buffer and execution of the operational behaviour script by the processor may cause the processor to use data stored in the buffer.

The apparatus may comprise a data input for receiving data from a source external to the apparatus and execution of the operational behaviour script by the processor may then be dependent on data received via the data input. Execution of the operational behaviour script by the processor may cause the processor to use data received via the data input to determine when to apply a message to an article and/or actions to take after applying a message to an article.

Execution of the operational behaviour script by the processor may cause the processor to determine whether or not the present conditions are valid for applying a generated message to an article.

The apparatus may comprise a memory storing one or more operational behaviour scripts for execution by the processor. The apparatus may comprise an input for allowing a user to select one of the one or more operational behaviour scripts stored in the memory for execution by the processor.

The apparatus may comprise an input for receiving one or more operational behaviour scripts from a source external to said apparatus.

The operational behaviour script may be in a human-readable format, the processor being arranged to execute the operational behaviour script by executing an interpreter for interpreting the human-readable format.

The operational behaviour script may be in a machine-readable format, the processor being arranged to execute the machine-readable format.

According to another aspect of the invention, there is provided a system comprising: a marking apparatus as described above; and a data source external to said marking apparatus and arranged to provide data to the marking apparatus via the data input of the marking apparatus for use by the processor of the marking apparatus when executing the operational behaviour script.

The data source may comprise a sensor for determining one or more properties of the article.

According to another aspect of the invention, there is provided a method of using a marking apparatus to apply a message to an article, wherein the apparatus comprises a processor and a printing arrangement for applying a message to an article, the method comprising: the processor generating a message for application to an article; the processor control the operation of the marking apparatus by, at least in part, executing an operational behaviour script formed using a scripting language; and the printing arrangement applying a generated message to an article.

In one embodiment, executing the operational behaviour script causes the processor to control the printing arrangement.

In one embodiment, the processor is arranged to provide default functionality to the apparatus and executing the operational behaviour script causes the processor to provide user-configured functionality to the apparatus.

In one embodiment, executing the operational behaviour script controls, at least in part, detection of an article to which a message is to be applied.

In one embodiment, executing the operational behaviour script controls, at least in part, when the processor generates a message for application to an article.

In one embodiment, executing the operational behaviour script controls, at least in part, when the processor generates an alert or a warning.

In one embodiment, executing the operational behaviour script controls, at least in part, determining than an event or an action has timed-out.

In one embodiment, executing the operational behaviour script causes the processor to provide data as an output from the apparatus.

In one embodiment, executing the operational behaviour script causes the processor to determine whether a sequence of events has been carried out in a correct order or with correct timing and to take an action in dependence on whether or not the sequence of events has been carried out in the correct order or with the correct timing.

In one embodiment, executing the operational behaviour script causes the processor to detect whether or not a specific event has occurred and to take an action in dependence upon whether or not the specific event has occurred.

In one embodiment, executing the operational behaviour script causes the processor to determine a rate at which specific events occur and to take an action in dependence on the determined rate.

In one embodiment, the apparatus comprises a clock and executing the operational behaviour script causes the processor to use an output of the clock to perform a time-based action or calculation.

In one embodiment, the apparatus comprises a buffer and executing the operational behaviour script causes the processor to use data stored in the buffer.

In one embodiment, the apparatus comprises a data input for receiving data from a source external to said apparatus and executing the operational behaviour script causes the processor to use data received via the data input. In one embodiment, executing the operational behaviour script causes the processor to use data received via the data input to determine when to apply a message to an article and/or actions to take after applying a message to an article.

In one embodiment, executing the operational behaviour script causes the processor to determine whether or not the present conditions are valid for applying a generated message to an article.

In one embodiment, the method comprises selecting one of a plurality of operational behaviour scripts being stored by the apparatus as the operational behaviour script to be executed by the processor.

In one embodiment, the method comprises receiving one or more operational behaviour scripts from a source external to said apparatus.

In one embodiment, the operational behaviour script is in a human-readable format, wherein executing the operational behaviour script comprises executing an interpreter for interpreting the human-readable format.

In one embodiment, the operational behaviour script is in a machine-readable format, wherein executing the operational behaviour script comprises executing the machine-readable format.

According to another aspect of the invention, there is provided a computer program which, when executed by a computer, carries out any one of the above-described methods. The computer program may be carried on a data carrying medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
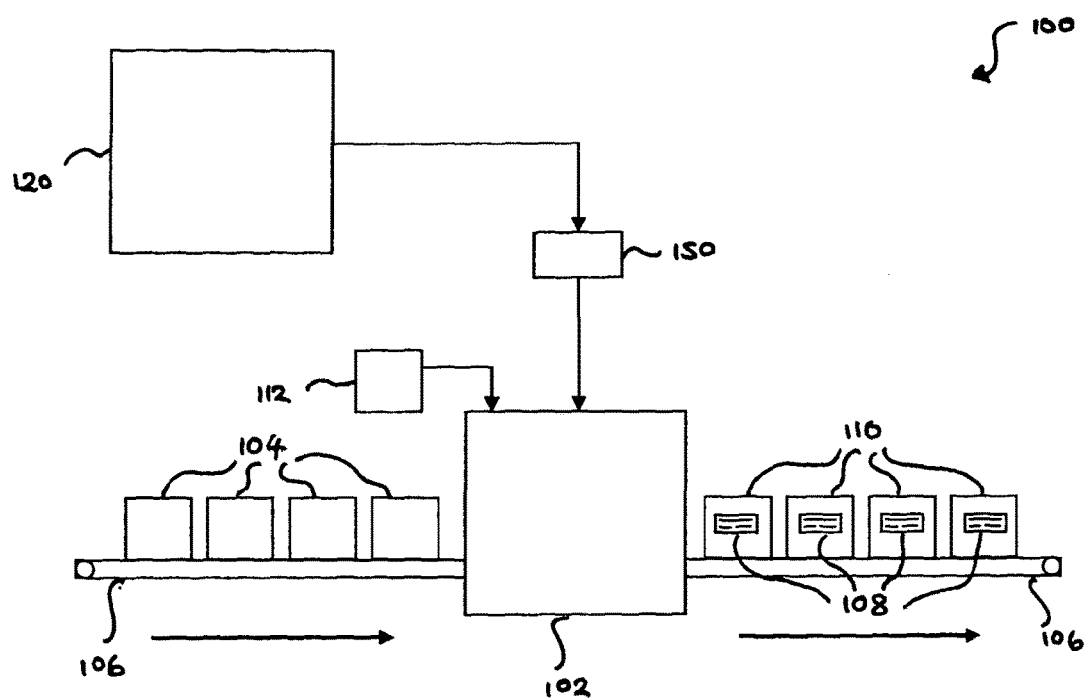
FIG. 1 schematically illustrates a system using a product-identification printer.

FIG. 1 schematically illustrates a system 100 using a product-identification printer 102. Unmarked articles 104 may be moved towards the product-identification printer 102 (for example, via a transportation or conveyor arrangement 106 or any other suitable conveyance mechanism such as a turntable). The product-identification printer 102 applies/prints a mark/message 108 on the unmarked articles 104 to produce marked articles 110. As will be described in more detail below, there may be one or more devices 112 (such as sensors, encoders, monitoring equipment, etc.) that provide inputs (data, signals, triggering events, etc.) to the product-identification printer 102 as part of the printing process. It will be appreciated, however, that other arrangements/configurations for applying messages to articles may be used. As will be described in more detail below, at a computer 120 remote from the product-identification printer 102 (hereinafter referred to as a remote computer), a user/operator may create an operational behaviour script 150 (or behaviour configuration script). This operational behaviour script 150 may then be transferred to the product-identification printer 102 for use in controlling (or at least partially controlling or influencing the operational behaviour of) the product-identification printer 102 so that it can mark articles 104. The transfer may be a transfer of a compiled operational behaviour script 150 (if the remote computer 120 is arranged to compile operational behaviour scripts into a machine-readable format) or of a non-compiled operational behaviour script 150 (for example, if the printer 102 is arranged to execute an interpreter to interpret non-compiled operational behaviour scripts in a human-readable format).

Figure 2:
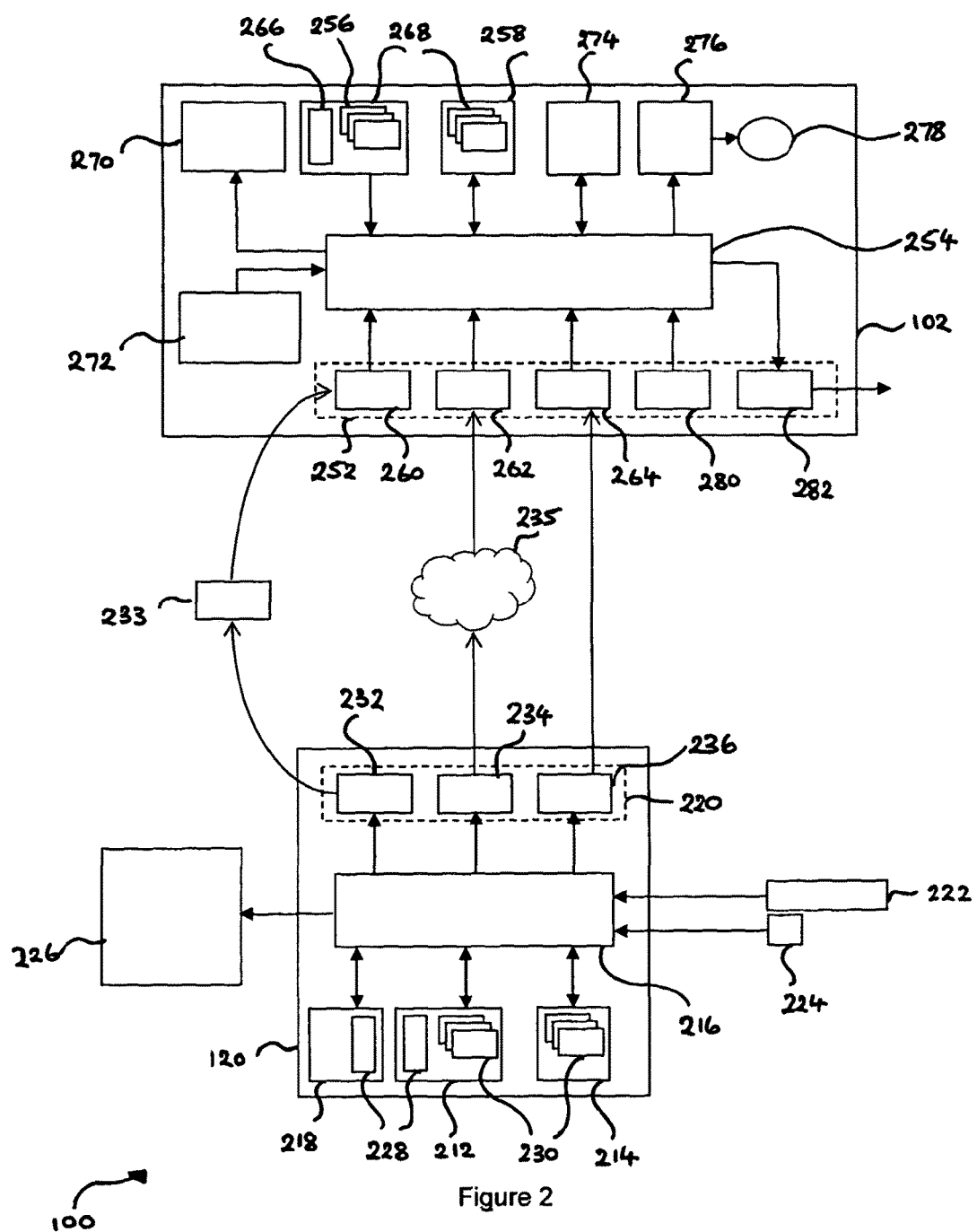
FIG. 2 schematically illustrates the system of FIG. 1 in more detail, according to an embodiment of the invention.

FIG. 2 schematically illustrates the system 100 in more detail, according to an embodiment of the invention.

The remote computer 120 may be any form of computing device suitable for generating an operational behaviour script 150 (such as a personal/desktop computer, a laptop, a personal digital assistant, etc). The remote computer 120 comprises a non-volatile memory (a read-only-memory) 212, a volatile memory 214 (such as a random-access-memory), a processor 216, a storage medium 218 (such as a hard-disk-drive) and an interface 220. A user may provide instructions/input to the processor 216 via one or more input devices (such as a keyboard 222 and a mouse 224, although other input devices may be used in addition or instead). The remote computer 120 may provide a visual display to the user by the processor 216 controlling a display 226 (such as an LCD screen/monitor).

The non-volatile memory 212 and/or the storage medium 218 may store one or more files/modules 228 having program instructions which form an operating system to be executed by the processor 216 of the remote computer 120. Additionally, the non-volatile memory 212 and/or the volatile memory 214 and/or the storage medium 218 may store one or more files 230 (or modules) which, together, form one or more software applications or computer programs that may be executed by the processor 216 and with which the user may interact in order to create, save, possibly compile, and output an operational behaviour script 150. Operational behaviour scripts 150 that have been created and/or modified may be stored by the remote computer 120, for example on the storage medium 218.

An operational behaviour script 150 (or a compiled operational behaviour script) created by a user at the remote computer 220 may be transferred or communicated to the printer 102 in a variety of ways. For example, the interface 220 may comprise a USB port 232 via which the processor 216 may store/save a (compiled) operational behaviour script 150 onto a USB memory device 233. The USB memory device 233 may then be used to load the operational behaviour script 150 onto the printer 102. Additionally, or alternatively, the interface 220 may comprise a network port 234 via which the processor 216 may communicate data (including a (compiled) operational behaviour script 150) to the printer 102 via a network 235 (such as the Internet, a local area network, a wide area network, a metropolitan area network, via Ethernet, etc.). Additionally, or alternatively, the interface 220 may comprise a serial or parallel interface 236 via which the processor 216 may communicate a (compiled) operational behaviour script 150 to the printer 102 via a serial or parallel communication link (such as an RS232 link). It will be appreciated, however, that the remote computer 120 may communicate operational behaviour scripts 150 to the printer 102 via any suitable method, which may be wireless or wired, and which may or may not involve using additional storage media.

The printer 102 comprises an interface 252, a processor 254, a non-volatile memory and/or storage medium 256 (such as a read-only-memory and/or a hard disk drive) and a volatile memory 258 (such as a random-access-memory).

The interface 252 provides a suitable mechanism for receiving (compiled) operational behaviour scripts 150 from the remote computer 110. For example, if an operational behaviour script 150 is to be communicated to the printer 102 via the USB memory device 233, then the interface 252 comprises a USB port 260 via which the processor 254 can access the operational behaviour script 150 from the USB memory device 233 and store the operational behaviour script 150 in the volatile memory 258 and/or the storage medium 256. Preferably, the operating system of the printer 102 is arranged to look for specific file extensions associated with operational behaviour scripts 150 in a specific location on the USB memory device 233 where the operational behaviour scripts 150 are to be located, so that that the printer 102 may automatically detect and upload operational behaviour scripts 150 from the USB memory device 233. Additionally and/or alternatively, if an operational behaviour script 150 is to be communicated to the printer 102 via the network 235, then the interface 252 comprises a network port 262 via which the processor 254 can access the operational behaviour script 150 over the network 235 and store the operational behaviour script 150 in the volatile memory 258 and/or the storage medium 256. Additionally and/or alternatively, if an operational behaviour script 150 is to be communicated to the printer 102 via a serial or parallel communication link, then the interface 252 comprises a serial or parallel communication port 264 via which the processor 254 can access the operational behaviour script 150 and store the operational behaviour script 150 in the volatile memory 258 and/or the storage medium 256. As with the remote computer 120, it will be appreciated that the printer 102 may receive operational behaviour scripts 150 via any suitable method, which may be wireless or wired, and which may or may not involve using additional storage media. The processor 254 may perform checks on received operational behaviour scripts (e.g. of their name, application, format, size, etc.) to ensure they are valid for subsequent use in the printer 102.

The non-volatile memory and/or storage medium 256 may store one or more files/modules 266 having program instructions which form an operating system to be executed by the processor 254 of the printer 102. Additionally, the non-volatile memory and/or storage medium 256 and/or the volatile memory 258 may store one or more files 268 (or modules) which, together, form one or more software applications or computer programs that may be executed by the processor 254 and which (i) may allow a user of the printer 102 to select an operational behaviour script 150; and (ii) execute a compiled operational behaviour script 150, or interpret a non-compiled operational behaviour script 150, to control (or at least partially control or influence the operational behaviour of) the printer 102. As such, the printer 102 may comprise an input mechanism 272 (such as a keyboard) via which a user may interact with the printer 102 and provide input (such as script selections) to the processor 254, as well as a display 270 (such as an LCD screen) for providing information visually to the user (such as a list of operational behaviour scripts 150). The display 270 and the input mechanism 272 may be combined, for example by using a touch-sensitive screen.

The printer 102 may also comprise a clock 274 (such as a real-time-clock) that the processor 254 may use when processing operational behaviour scripts 150 to determine and use time-based information (such as the current time and date). For example, the processor 254 may use of the output of the clock 274 to determine trigger events, or to determine a time-based trigger event, or to calculate when an event or action has timed-out, etc. The processor 254 may use the output of the clock 274 to determine a timing parameter associated with the desired operational behaviour for the printer 102 to trigger an event.

Additionally, to actually perform the printing the printer 102 comprises a printer engine 276 and a print head 278 (which together may be considered a printing arrangement). The printer engine 276 receives message data (a generated print message) from the processor 254 that defines a message 108 to be printed on an article 104, and, in response to receiving the message data (or in response to detecting a "print go" event), controls the print head 278 to actually perform the printing of the message 108 onto the article 104 to formed a marked article 110. The printing arrangement may make use of any suitable printing technology/method, such as continuous inkjet printing, drop-on-demand inkjet printing, laser printing, etc.

The printer 102 may comprise (for example, as part of the interface 252) an input 280 for receiving other external inputs/stimuli. For example, the input 280 may receive data from devices external to the printer 102 so that the processor 254 may adapt the message 108 to be printed in accordance with the received data (e.g. by inserting that received data into the output print message 108). Examples of such devices include one or more sensors (not shown) that may be monitoring the printing process or some other process (such as a monitor for the conveyor belt 106 or a sensor that detects the particular type of unmarked article 104, thereby enabling the insertion of an indication of the type of the article 104 into the content of the message 108). The device may comprise a sensor that detects, or determines, one or more attributes or properties of the article 104. For example, a weigh-scale (not shown) may be arranged to provide a weight value, for example via an RS232 interface of the input 280, thereby allowing the processor 254 to insert the weight of an article 104 into a message 108 for printing on that article 104. As a further example, data may be received at the input 280 from the conveyor belt mechanism 106 or from a switching apparatus on a production line (not shown) that may then be used by the processor 254 to generate a message 108 that has tracking and/or sorting information to thereby allow marked articles 110 to be sorted or tracked. The input 280 may have its own memory (not shown, but may be, for example, implemented as a shift-register into which an external device may insert data and from which the processor 254 may retrieve data) or may make use of the volatile memory 258.

The printer 102 may comprise (for example, as part of the interface 252) an output 282 for outputting data. The output 282 may be integral with the input 280. For example, the input/output 280/282 may comprise a port with one or more pins (physical or virtual) via which a user or a device may set a state (to be interpreted by the printer 102) and/or via which the printer 102 or processor 254 may set a state (to be interpreted by a user and/or device connected to the output 282).

The input 280 and/or the output 282 could be implemented as a shift register arrangement or as a buffer, to which data may be written and read.

The system 100 may comprise one or more sensors (not shown) arranged to detect when an unmarked article 104 is in a position (or has reached a location) at which the printer 102 should commence marking of that article 104 with a message 108. A sensor may provide a "product detect" signal to the input 280 of the printer 102 to indicate that an article 104 has been detected. Such a sensor may be, for example, a photo-cell that is activated as an article 104 reaches a predetermined position in close proximity to the printer head 278. Other types of product detection sensors may be used to provide product detect signals to the input 280, as are known in this field of technology.

Additionally, or alternatively, the system 100 may include an encoder (not shown) that is arranged to output a signal indicating the rate of conveyance of the articles 104 along the conveyor arrangement 106 (e.g. data specifying how fast a conveyor belt is moving) or, more generally, the speed at which articles 104 are being moved towards the printer 102. The encoder could be, for example, coupled to the conveyor arrangement 106 via a shaft that rotates as the conveyor arrangement moves articles 104 towards the printer 102—the encoder may then output a signal (e.g. a series of pulses) that indicate a rate of rotation of that shaft. Alternatively, the encoder could measure a linear rate of movement of the conveyance and output a signal accordingly (which again could be a series of pulses). The time between consecutive pulses may then indicate the rate of conveyance. Other types of encoder could be used to monitor/detect the rate of conveyance being provided by the conveyor arrangement 106. The encoder may provide a signal to the input 280 of the printer 102. The printer 102 may then make use of this signal to ensure that the print position and print width for the message 108 to be printed on an article 104 is kept constant regardless of any variations in the conveyance speed.

In particular, the printing arrangement is usually configured to print a message 108 on an article 104 via a series of "strokes", where a stroke is column or band or line of printing (e.g. a sequence of adjacent ink dots) normally orthogonal to the direction of conveyance being provided by the conveyor arrangement 106. The sequence of strokes printed on the article 104 make up the message 108. The rate at which strokes are generated/applied (known as the "stroke go rate") may be a fixed rate, but may alternatively be dependent on the signal output from the encoder, in which case the timing of applying strokes to an article 104 will depend on how fast that article 104 is passing the print head 278. In some embodiments, the printer 102 and/or the encoder may comprise or make use of a so-called "digital gearbox" that is arranged to scale up or down the signal output from the encoder which indicates the conveyance rate—for example, by multiplying up or dividing down by a predetermined amount the frequency of pulses being output by the encoder. The digital gearbox is useful to allow the encoder pulse rate to be matched to, or brought into synchronisation with, a desired stroke go rate.

As mentioned above, a user at the remote computer 102 may use an application (or software tool or development environment) executed at the remote computer 102 to form (or create and/or edit) an operational behaviour script 150. The operational behaviour script 150 is formed using (or is written in) a scripting language. An example scripting language is the open source Lua Scripting language (http://www.lua.org/home.html), but it will be appreciated other scripting languages (such as VBScript and PERL) could be used instead. The scripting language may provide a user with a collection of building blocks (such as logical and arithmetic operations), a collection of data types and a predefined syntax that allow the user to generate an operational behaviour script 150. The datatypes could include, for example, one or more of: (a) Number—Lua uses reals and floats as number data types but others could be supported; (b) String—arrays of characters; (c) Boolean—true or false; (d) Table—in Lua this is an aggregate data type representing a list or array of items—e.g a list of strings or an array of numbers; (e) Userdata—customised data types that are user specific.

The term "script" as used herein is therefore intended to mean a set of human readable instructions for performing logical and arithmetic operations. A script may comprise of one or more collections or sequences of procedural logic to form one or more program functions and/or procedures. Thus, an operational behaviour script 150 is a (text) document that may be written and understood by a human being, the document comprising commands to be interpreted by the processor 254 of the printer 102. The instructions of the script may be subsequently integrated, compiled or interpreted by the processor 254 to create machine functions to control the printer 102. The nature/purpose of these functions shall be described in more detail later.

Figure 3:
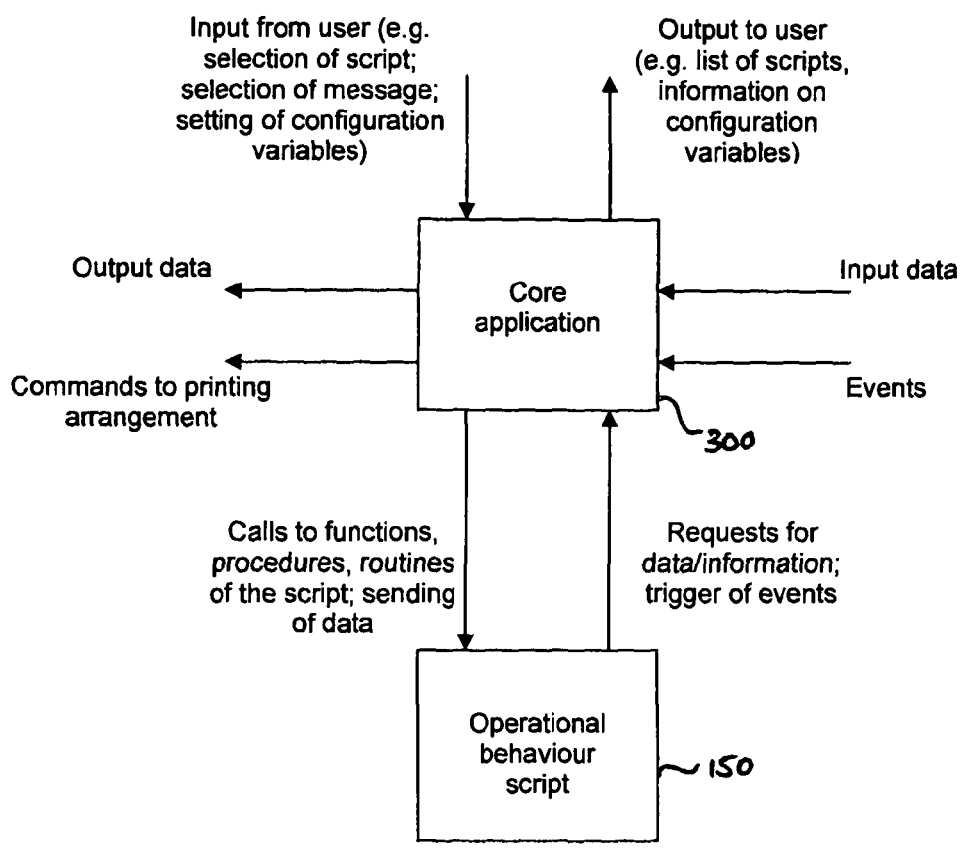
FIG. 3 schematically illustrates at a high level various data flows according to embodiments of the invention.

Reference will now be made to FIG. 3, which schematically illustrates at a high level various data flows according to embodiments of the invention.

As mentioned above, the one or more files 268 (or modules) together form a software application or computer program (shown in FIG. 3 as a "core application" 300) for execution by the processor 254 of the printer 102. The core application 300 provides the printer 102 with core functionality, i.e. the execution of the core application 300 provides the printer 102 with its default operational behaviour, i.e. non-customised, non-application-specific functionality. However, the core application 300 may execute a compiled operational behaviour script 150, or interpret a non-compiled operational behaviour script 150, to control (or at least partially control or influence the operational behaviour of) the printer 102. In particular, the operational behaviour script 150 may include one or more so-called "callback" functions (or simply a callback)—a callback is executable/interpretable code, a reference to which may be passed as an argument to other code; this allows a lower-level software layer (the core application 300) to call a function (or subroutine or procedure) defined in a higher-level software layer (the operational behaviour script 150), usually in response to a specific event occurring. The core application 300 may call one or more of the callback functions of the operational behaviour script 150 in order to provide modified behaviour/printer-activity. In other words, the core application 300 may make use of the operational behaviour script 150 to provide functionality in addition to, or in place of, the default functionality usually provided by the core application 300. Thus, the operational behaviour 150 of the printer 102 is changed and/or extended, or becomes non-standard, by virtue of the operational behaviour script 150. Use of the operational behaviour script 150 modifies or influences the criteria surrounding the generation and application of the print message 108 to an article. Specific examples of how the functionality of the printer 102 may be enhanced by virtue of using an operational behaviour script 150 shall be described later. This configuration of the printer 102 with specific behaviour via the behaviour configuration script 150 may be performed without having to update or change the core application 300.

When an operational behaviour script 150 is first loaded onto the processor 254, the processor 254 may check the validity of the operational behaviour script 150 to make sure that the operational behaviour script 150 makes sense and can be executed/interpreted correctly during a printing cycle. This may include, for example, ensuring that that operational behaviour script 150 conforms to all of the rules and/or syntax stipulated by the specific scripting language being used. The printer 102 may output a warning if any errors or problems are detected in the operational behaviour script 150. However, the core application 300 may continue and try to use the operational behaviour script 150 as best it can, despite the errors. If, however, the core application 300 cannot continue on detecting an error in the operational behaviour script 150, then the core application 300 may ignore the operational behaviour script 150 and the core application 300 may revert to its factory default behaviour and raise an alert (error condition). This alert may be configurable so that the user can change its severity to stop the printer 102 from printing if required.

When the operational behaviour script 150 is initially run or loaded by the processor 254, the processor 254 may register the various callbacks of the operational behaviour script 150. The processor 254 may also perform any required initialisation (e.g. to initialise configuration parameters—see later).

Example callbacks include:

CBUserPortPin—the core application 300 may call this function when it detects that a user port pin (for example a pin on the input 280) changes state. Thus the CBUserPortPin callback defined in the operational behaviour script 150 may provide bespoke functionality to the printer 102 so that the printer 102 can respond to specific user inputs. Similar callback functions could be implemented for the core application 300 to call upon a receipt or change in data provided to the printer 102 (e.g. data received at the input 280, such as via a buffer or shift register).

CBProductDetect—the core application 300 may call this function when a product detect signal is received by the printer 102. Thus the CBProductDetect callback defined in the operational behaviour script 150 may provide bespoke functionality to the printer 102 so that the printer 102 can respond in a configurable way to the detection of a new article 104 to mark. Similar callback functions could be implemented for the core application 300 to call upon a detection of any other kind of signal or event.

CBPrintEnable—the core application 300 may call this function when a print enable signal is received by the printer 102. A print enable signal indicates whether or not printing is enabled or disabled. If the print enable is not asserted (i.e. disabled), then printing shall be prevented regardless of whether the printer receives a print go event—printing will only be resumed when the print enable signal is asserted.

Of course, the actual functionality to be provided by these callbacks will vary depending on the instructions that the writer(s) of the operational behaviour script 150 included in the operational behaviour script 150 for these callbacks. In this way, the functionality of the printer 102 is user-configurable via the operational behaviour script 150. It will be appreciated that other callbacks may be provided in the operational behaviour script 150 for use by the core application 300.

The operational behaviour script 150 may also include other functions, such as the following:

Functions that return information from the core application 300 to the operational behaviour script 150. Examples include:
GetUserPortPin—Get the state of a user port pin (for example a pin on the input 280).
GetEncoderRunningPosition—Get the encoder position (i.e. the output from the encoder).

Functions that send information to the core application 300, or that send instructions to the core application 300 for the core application 300 to perform a specific action, from the operational behaviour script 150. Examples include:
SetTriggerPrint—Set a print trigger to cause a print go event (i.e. to instruct the printing arrangement to actually carry out a printing operation on an article 104).
SetUserPortPin—Set the state of a user port pin (for example a pin on the output 282).
SetRaiseAlert—Raise an alert/warning. The core application 300 could then output the warning to a log file stored in the storage medium 256 and/or the volatile memory 258, could output the warning via the display 270, or could output the warning via the interface 252 (e.g. via the network port 262 or the output 282).
Print—Allows text to be output to a standard output (e.g. via the output 282) for debugging purposes.

Functions related to configuration variables (configurations variables shall be described in more detail shortly). Examples include:
GetConfVarsNr—Get the number of configuration variables
GetConfVarInfo—Get the details of all configuration variables
GetConfVars—Get the current values of all configuration variables
SetConfVars—Set the values of all configuration variables
SetDefConfVars—Set the values of all configuration variables to default values. These defaults may be defined in the operational behaviour script 150.

Thus, as shown in FIG. 3, the core application 300 may interact with the operational behaviour script 150 by calling callback functions of the operational behaviour script 150, providing data to the operational behaviour script 150 in response to requests from the operational behaviour script 150, and responding to actions invoked by the operational behaviour script 150 (such as the triggering of events). The core application 300 may also receive input from a user/operator of the printer 102 (e.g. via the input mechanism 272), such as a selection of a particular operational behaviour script 150 to use, the selection of a particular message type to use for marking articles 104, the input of values for configuration variables, etc. The core application 300 may also provide output to a user/operator of the printer 102 (e.g. via the display 270), such as a list of available operational behaviour scripts 150 for selection, the current values of (or other information about) configuration variables, etc. The core application 300 may also receive input in the form of input data and/or events (e.g. product detect signals, data from the encoder, data from other devices connected to the interface 252, data asserted by a user via the input 280, etc.). The core application 300 may also provide output in the form of a print trigger (or print go event) to cause the printing arrangement to perform a marking of an article 104. Other data may also be output, e.g. debugging data or log files via the output 282.

The operational behaviour script 150 may include one or more attributes or parameters, furthermore known as "configuration variables", that define or configure the functionality provided by the operational behaviour script 150 (by virtue of the values held by these variables). The operational behaviour script 150 may allow modification of its behaviour further whilst it is being executed/interpreted by the processor 254. This could be, for example, by way of applying updated numeric or textual values to one or more attributes that define the operational behaviour from an external source. This external source could be a human operator (via a human-machine interface such as the input mechanism 272 and display 270) or a device external to the printer 102 (via the interface 252, such as from a computer over a network connection). Additionally or alternatively, specific configuration variables may be defined as read-only attributes, in which case this would provide a mechanism for allowing an operator to view, but not change, some information about the internal state of the operational behaviour script 150 dynamically whilst it is being executed on the processor 254. The configuration variables may be described within the operational behaviour script 150 by information which indicates the way they can be manipulated/modified and the way in which they should be presented to any external device or user interface.

The operational behaviour script 150 may also provide a mechanism by which all the configuration variables are returned to a default value to allow the resetting of the behavioural configuration to a known state.

In one embodiment, the configuration variables are described in a predefined format. In particular, each configuration variable is associated with a (scripting language) variable and is defined by this variable (and its value). The format may also stipulate that the configuration variable is defined by one or more of the following:
an associated default value;
a textual name which is used to identify this configuration variable to an operator via the display 270;
an access flag indicating whether the configuration variable is read-only or read-write—for example, an indication as to whether the configuration variable can only be output to the display 270, or whether, in addition, input can be received to manipulate its value via the input mechanism 272 or some other means;
a description of the possible values the configuration variable could take—for a configuration variable which assumes a numeric value this may be a maximum value and/or a minimum value and for a configuration variable which assumes a textual string value this may be a list of possible string values.

As mentioned above, the operational behaviour script 150 may implement functions which can be used to obtain the information about all available configuration variables, read the value of a particular configuration variable and set the value of a particular configuration variable. When the value of any of these configuration variables is modified via these functions (e.g. upon instruction from the core application 300 in response to input from a user), the behavioural configuration of the printer 102 can be dynamically modified accordingly.

Figure 4:
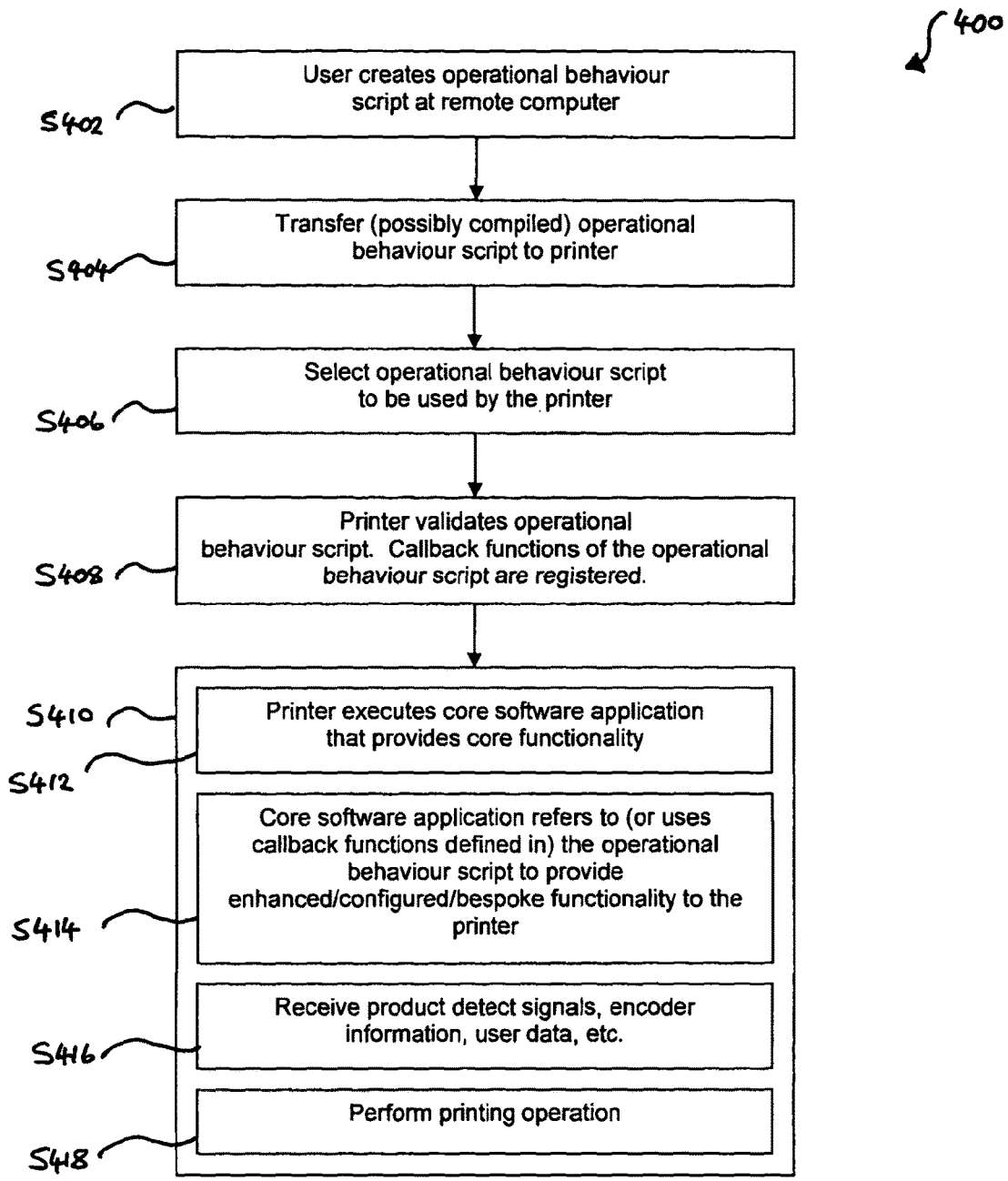
FIG. 4 schematically illustrates a method according to an embodiment of the invention.

FIG. 4 schematically illustrates a method 400 according to an embodiment of the invention.

At a step S402, one or more users of the remote computer 120 write an operational behaviour script 150 using a scripting language (as described above).

In one embodiment, all behaviour configurations are written with one main (primary) operational behaviour script 150 with zero or more optional support scripts for use in conjunction with (and to be called on by) the main operational behaviour script 150. The name of the main operational behaviour script 150 may be used as the name presented to the user to identify the configuration. Preferably, all support scripts are stored in a folder of the same name as the main operational behaviour script 150 at the remote computer 120 and/or on the USB memory device 233 and/or at the printer 102. A common area/folder may be defined at the remote computer 120 and/or on the USB memory device 233 and/or at the printer 102 to contain all scripts. There may be a predetermined maximum number of different configurations (i.e. different main operational behaviour scripts 150 and associated sub-folders), such as 32 configurations. There may be a predetermined maximum number of scripts permitted per configuration (including the main operational behaviour script 150), such as 8 scripts. There may be a predetermined maximum size for each script, such as 32 kB.

The step S402 may include compiling the operational behaviour script 150 (and any associated support scripts).

At a step S404, the operational behaviour script 150 (and any associated support scripts)—possibly in compiled form—is transferred over to the printer 102 (as has been described above).

At a step S406, an operator of the printer 102 may select, from a list, displayed on the display 270, of operational behaviour scripts 150 being stored at the printer 102, a particular operational behaviour script 150 to be used for the current printing run. The operator may make the selection via the input mechanism 272. Preferably, only one operational behaviour script 150 can be active at any one time. If an operator selects an operational behaviour script 150 for the printer 102 to use and there is another operational behaviour script 150 that is currently active, then that currently active script may be disabled and will no longer be active—the newly selected operational behaviour script 150 is then applied and validated (at a step S408 below) and, if successful, activated. This de-activation/activation process does not require a printer power-cycle for the printer behaviour to be configured using downloaded scripts. If no operational behaviour script 150 is selected and active then the behaviour of the printer 102 is the default behaviour as with no scripts loaded—i.e. the default behaviour provided by the core application 300 alone.

An operator may be allowed to delete an operational behaviour script 150 from storage at the printer 102. In the event of this operational behaviour script 150 being currently active, the operator may be warned that this deletion is not currently possible. In the event that the operational behaviour script 150 is not active, it is removed from the storage at the printer 102.

Once an operator has selected an operational behaviour script 150 as described above, the printer 102 may remain configured with that active operational behaviour script 150 until the operator selects a different operational behaviour script 150.

At a step S408, the printer 102 (via the processor 254 and possibly via the core application 300) validates the received operational behaviour script 150 (and any associated support scripts) and registers callback functions with the core application 300 (as has been described above).

At a step S410, a print run is performed to mark articles 104 with messages 108.

The step S410 involves a step S412 at which the processor 254 executes the core application 300.

Assuming that an operational behaviour script 150 has been selected and is active, the step S410 also involves a step S414 at which the processor 254 interprets and/or executes that operational behaviour script 150 under the control of the core application 300 (as has been described above).

The step S410 may also include a step S416 at which inputs to the printer 102 and/or to the core application 300 and/or to the operational behaviour script 150 may be received (e.g. print detect signals, signals from an encoder, data supplied via the input 280 from a user or other device, etc.). The core application 300 and/or the operational behaviour script 150 may respond to inputs, or use the data received—examples of this shall be given later.

Finally, the step S410 includes a step S418 of performing the actual marking of an article 104 with a message 108. The core application 300 controls the generation of the message and instructs the printer engine 276 (via a print go event) to actually perform the printing. Generation of messages is described in co-pending application PCT/GB2008/002256. The timing and/or conditions of marking the article may be controlled by the core application 300 making use of functionality provided by the operational behaviour script 150.

It will be appreciated that the steps S412, S414, S416 and S418 are generally performed asynchronously during the print run step S410.

The following are examples of operational functionality/behaviour that may be encoded within, and provided by the operational behaviour script 150. In general, though, the operational behaviour of the printer 102 relates to how (i.e. the circumstances under which, when and in response to what criteria or stimuli) the printer 102 responds to events/triggers and/or generates events/triggers, the nature of data input to and output from the printer 102 (such as when warnings are generated, how logs may be generated), etc. In other words, the operational behaviour script 150 may control how and when messages 108 are to be generated and applied to an article 104 (but not necessarily exactly what to print, i.e. not necessarily the contents of the message 108). The operational behaviour script 150 may also control how the printer 102 responds to various stimuli (such as component failure, requests from users, or, more generally, how to respond when a specific event happens). The operational behaviour script 150 enables signals/events/triggers/data/other stimuli to be mapped to configured application-specific functions and procedures in order to be able to provide bespoke customised behaviour and capabilities to the printer 102.

Some of the operational functionality may relate to detecting (in a manner configured by the configuration behaviour script 150) whether specific events or actions (or specific series of events or actions) have or have not occurred (and possibly whether they have occurred in a suitable/correct order). Some of the operational functionality may relate to generating or triggering events, or taking other actions (e.g. generating alerts or warnings), accordingly based on detection (or non-detection) of events. For example:

The operational behaviour script 150 may include a function to trigger a product detect event (i.e. an event indicating to the processor 254—or to the core application 300—that an article 104 to be marked has been detected).

One example way of doing this is to generate a product detect event when 'n' encoder pulses have been received from the encoder before the digital gearbox (where n may be a predetermined value or may be a configuration variable) since the last product detect event. Thus, for example, on receiving a pulse from the encoder, the core application 300 may call a callback function of the operational behaviour script 150 that is used to inform the operational behaviour script 150 that an encoder pulse has been received. If this function then determines that n encoder pulses have been received since the last product detect event, then this function may trigger a new product detect event. This is useful when the product detect signal to be used by the printer 102 is derived from the input from the encoder (rather than a discrete product detect signal from a separate sensor). This is particularly applicable to environments where a product detect sensor cannot be fitted in close proximity to the printer head 278 or where there is a correlation between distance and encoder rotation to derive a product detect signal e.g. on a turn-table. Having the ability to "tap-off" the raw encoder pulse train before it is multiplied up or divided down through the digital gearbox is a useful feature.

In a similar manner to the above, the operational behaviour script 150 may include a function to trigger a product detect event (i.e. an event indicating to the processor 254—or to the core application 300—that an article 104 to be marked has been detected) on every 'n' encoder pulses received from the encoder after the digital gearbox.

The operational behaviour script 150 may include a function to disable printing (or to not print a current message 108 or to take some other appropriate action) if a sequence of timing events is received in an incorrect order or too close together. The core application 300 may call a callback function of the operational behaviour script 150 that is used to inform the operational behaviour script 150 that this/these event(s) have occurred, and this function may then determine whether or not these events have been received in an incorrect order or too close together. For example, if an encoder pulse is received within 'x' ms of a print-go event, then printing may be disabled (where x may be a predetermined value or may be a configuration variable). This kind of functionality this is applicable to handle situations in the printing where the conditions for printing become invalid. For example, if the input signals that determine when to print are variable and under external influences from one or more sources, they may occur asynchronously, and the operational behaviour script 150 may be used to define a bespoke set of time-domain driven rules which can be applied to define what is deemed to be valid input criteria to prevent incorrect printing from occurring if these time driven rules are not met.

The operational behaviour script 150 may include a function to monitor the product detect rate(s) and take appropriate action based on the determined rate. Thus, for example, on receiving a product detect signal, the core application 300 may call a callback function of the operational behaviour script 150 that is used to inform the operational behaviour script 150 that a product detect signal has been received. This function may calculate (using the clock 274) the rate of product detections and if this rate goes above and/or below a threshold (which may be predetermined or which may be defined by a configuration variable) for a period of time (which may be predetermined or which may be defined by a configuration variable), this function may take appropriate action (such as raising a configurable alert and/or asserting a user-definable signal). This is particularly applicable to handle a situation in printing where the printer 102 is being supplied with a variable external product detect rate from an input sensor and the product detect rate changes such that it moves outside a defined window of operation.

Similarly, functionality may be provided by the operational behaviour script to monitor (and take appropriate action) with respect to other rates, such as the stroke go rate.

The operational behaviour script 150 may include a function to provide a configurable timeout to trigger an action after a period of time of not receiving or detecting certain signals or events (such as not receiving print-go signals mid-way through a print). This function of the operational behaviour script 150 could therefore be used to detect a prolonged stoppage time and trigger one or more events to occur (such as phasing or some form or recalibration or raising an alert) so that when printing resumes, any change in environment has been catered for.

This may be used to, for example, to ensure that phasing does not drift with time, which is a useful feature in situations in which printing may become stopped mid-print for a period of time e.g. 20 minutes. In this event, phasing can drift resulting in bad-prints for the first few prints when the printing process starts again. The concept of "phasing" is known in this field of technology, and so is described only briefly below. A charging voltage may be applied to ink droplets discharged from the nozzle of a continuous ink-jet printer—this voltage may be controlled by varying the phase of the charging voltage placed upon a droplet in dependence upon the time-phase relationship between the droplet and the charging voltage. Processes are known and used to automatically track and adjust this time-phase relationship to maintain good print quality. This is known as phasing.

The detection of articles 104 and/or the timing out of events and/or the detection of other conditions by the operational behaviour script 150 may be used to control the timing of when the operational behaviour script 150 actually generates a message 108 for application to an article 104.

Some of the operational functionality may relate to being able to couple a plurality of printers 102 together, for example for coordinating printing across the plurality of printers 102 or to allow one printer 102 to become active when a fault occurs in another printer 102. For example, the operational behaviour script 150 may include a function for two printers 102 to handshake together and provide an alternating print function. This function may monitor the other printer 102 and if one of the printers 102 fails, then this function may cause the other printer 102 to take over the printing tasks of the now-failed printer 102. In one embodiment, this function may be arranged such that one of the printers 102 provides print-go events/commands alternating between the available printers 102 so that the plurality of printers 102 may work together to alternate the print sequence between them.

Some of the operational functionality may be bespoke functionality that handles or responds to certain data received from a user or from a device and/or that provides certain data as an output to a user or a device. For example:

- The operational behaviour script 150 may include a function to display a current print speed and/or a current line speed. For example, on receiving a product detect signal, the core application 300 may call a callback function of the operational behaviour script 150 that is used to inform the operational behaviour script 150 that a product detect signal has been received. Using the clock 274, this function may monitor the rate of product detect signals and reporting it (e.g. to a user via the display 270) as a function of time averaged over a number of samples (which may be a predetermined number of may be set by a configuration variable).
- The operational behaviour script 150 may include a function to assert a user port output pin (or provide some other form of output data to a user or device) depending on the orientation of the message 108 being printed (e.g. for camera systems) e.g. if a message 108 is being printed in reverse. The form of the output data may be configurable via the operational behaviour script 150.
- The operational behaviour script 150 may include a function to assert a user port output pin (or provide some other form of output data to a user or device) at the end of a print for an article 104. The form of the output data may be configurable via the operational behaviour script 150. This may be used, for example, in a traversing system to determine when a traverser can move to the next article 104 so that that next article 104 may be put in position for marking.
- The operational behaviour script 150 may include a function to provide as an output (e.g. via the output 282) a copy (or version) of a message 108 that has been printed on an article 104. This function may be used as part of a callback function that the core application 300 uses when it detected a print go event. The actual form of the copy/version and the format used may be configured via the operational behaviour script 150. This may be applicable for verification processes where an external verification device receives the copy/version of the message 108 and parses it to ensure that what has been printed is what was expected to be printed.
- The operational behaviour script 150 may include a function to clock the state of a user configurable signal pin into and/or out of a buffer (e.g. a FIFO buffer) on receipt of an event on another pin. The function may feed the state of the element clocked out of the buffer as a software print-go signal into the rest of the printer 102 (rather than using the physical print-go signal). This may be used to facilitate a configurable 'shift-register' mechanism to capture data which can be used for printing itself (as input data for printing elements) or for controlling and/or masking printing operations.
- The operational behaviour script 150 may include a function to send an ack/nack event over a communications channel (e.g. via the interface 252) based on an alert state. This may be applicable where the printer 102 is integrated into a larger system which is capable of monitoring the status of the printer 102. The printer 102 can therefore be configured to send an event to the monitoring system if its status changes—for example from a 'Ready to Print' state to a 'Fault State'; alternatively the printer 102 can be configured or report its current state regularly (e.g. every 5 seconds or on every print).
- The operational behaviour script 150 may include a function change or alternate between two or more messages 108 to be used for the printing process. For example, on receiving a product detect signal, the core application 300 may call a callback function of the operational behaviour script 150 that is used to inform the operational behaviour script 150 that a product detect signal has been received. This function may then change or swap between two or more messages 108 for printing on the next article 104.
- The operational behaviour script 150 may include a function to change the content of the message 108 in dependence upon data received via the input 280 (e.g. data provided by a user a buffer). For example, on detecting a change in the data at the input 280, the core application 300 may call a callback function of the operational behaviour script 150 that is used to inform the operational behaviour script 150 that new input data has been received. This function may then change the content of the message 108 accordingly.

In one embodiment, the system, 100 may be arranged to allow an operational behaviour script 150 being stored at the printer 102 to be transferred from the printer 102 to the remote computer 120 for subsequent editing at the remote computer 120. This transfer may be achieved in a similar manner to that in which an operational behaviour script 150 is transferred from the remote computer 120 to the printer 102 (as discussed above).

As mentioned above, the operational behaviour script 150 that is transferred from the remote computer 120 to the printer 102 is usually in human readable form. This is because speed of execution of the operational behaviour script 150 by the printer 102 is usually not a critical factor—as such, the execution of the operational behaviour script 150 by the processor 254 of the printer 102 may involve the processor 254 executing an interpreter to interpret the operational behaviour script 150. The script interpreter may be compiled into the core application 300. However, if higher transfer speeds and/or reduced execution/processing time is desired, then the processor 254 of the printer 102 may be arranged to execute a compiler to compile and then store operational behaviour scripts 150 that are received by the printer 102 so that the compiled operational behaviour scripts 150 are ready for execution by the processor 254. Alternatively, the remote computer 102 may be arranged to execute a compiler to compile operational behaviour scripts 150 prior to sending them to the printer 102.

It will be appreciated that embodiments of the invention may be implemented using a variety of different information processing systems. In particular, although FIG. 2 and the discussion thereof provide an exemplary computing and printing architecture, this is presented merely to provide a useful reference in discussing various aspects of the invention. Of course, the description of the architecture has been simplified for purposes of discussion, and it is just one of many different types of architecture that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

As described above, the system 100 comprises a remote computer 120. The remote computer 102 may be any type of computer system, such as a personal computer system, mainframes, minicomputers, servers, workstations, notepads, personal digital assistants, and mobile telephones, and may comprise a plurality of such devices interconnected to form a computing system.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A marking apparatus for applying a message to an article, the apparatus comprising:
   a processor arranged to generate the message for application to the article and to control the operation of the marking apparatus by, at least in part, executing an operational behaviour script formed using a scripting language, wherein the processor is also arranged to execute a core application to provide default functionality to the marking apparatus, wherein execution of the operational behaviour script controls how and when the message is generated, and wherein the execution of the operational behaviour script does not generate content of the message;
   wherein execution of the operational behaviour script by the processor causes the processor to do one or more of the following:
      control, at least in part, determining that an event or an action has timed-out;
      determine whether a sequence of events has been carried out in a correct order or with correct timing and to take an action in dependence on whether or not the sequence of events has been carried out in the correct order or with the correct timing;
      determine a rate at which specific events occur and to take an action in dependence on the determined rate; and
      use an output of a clock of the marking apparatus to perform a time-based action or calculation; and
   a printing arrangement for applying the generated message to the article.

2. An apparatus according to claim 1, wherein execution of the operational behaviour script by the processor causes the processor to control the printing arrangement.

3. An apparatus according to claim 1, wherein execution of the operational behaviour script by the processor causes the processor to provide user-configured functionality to the apparatus.

4. An apparatus according to claim 1, in which execution of the operational behaviour script by the processor controls, at least in part, detection of the article to which the message is to be applied.

5. An apparatus according to claim 1, in which execution of the operational behaviour script by the processor controls, at least in part, when the processor generates the message for application to the article.

6. An apparatus according to claim 1, in which execution of the operational behaviour script by the processor controls, at least in part, when the processor generates an alert or a warning.

7. An apparatus according to claim 1, in which execution of the operational behaviour script by the processor causes the processor to provide data as an output from the apparatus.

8. An apparatus according to claim 1, in which execution of the operational behaviour script by the processor causes the processor to detect whether or not a specific event has occurred and to take an action in dependence upon whether or not the specific event has occurred.

9. An apparatus according to claim 1 comprising a buffer, wherein execution of the operational behaviour script by the processor causes the processor to use data stored in the buffer.

10. An apparatus according to claim 1 comprising a data input for receiving data from a source external to said apparatus, wherein execution of the operational behaviour script by the processor is dependent on data received via the data input.

11. An apparatus according to claim 10, wherein execution of the operational behaviour script by the processor causes the processor to use data received via the data input to determine when to apply the message to the article and/or actions to take after applying the message to the article.

12. An apparatus according to claim 1, wherein execution of the operational behaviour script by the processor causes the processor to determine whether or not present conditions are valid for applying the generated message to the article.

13. An apparatus according to claim 1 comprising a memory storing one or more operational behaviour scripts for execution by the processor.

14. An apparatus according claim 13, comprising an input for allowing a user to select one of the one or more operational behaviour scripts stored in the memory for execution by the processor.

15. An apparatus according to claim 1, comprising an Input for receiving one or more operational behaviour scripts from a source external to said apparatus.

16. An apparatus according to claim 1, in which the operational behaviour script is in a human-readable format, the processor being arranged to execute the operational behaviour script by executing an interpreter for interpreting the human-readable format.

17. An apparatus according to claim 1, in which the operational behaviour script is in a machine-readable format, the processor being arranged to execute the machine-readable format.

18. A system comprising:
a marking apparatus for applying a message to an article, the apparatus comprising:
  a processor arranged to generate the message for application to the article and to control the operation of the marking apparatus by, at least in part, executing an operational behaviour script formed using a scripting language, wherein the processor is also arranged to execute a core application to provide default functionality to the marking apparatus, wherein execution of the operational behaviour script controls how and when the message is generated, and wherein the execution of the operational behaviour script does not generate content of the message;
  wherein execution of the operational behaviour script by the processor causes the processor to do one or more of the following:
    control, at least in part, determining that an event or an action has timed-out;
    determine whether a sequence of events has been carried out in a correct order or with correct timing and to take an action in dependence on whether or not the sequence of events has been carried out in the correct order or with the correct timing;
    determine a rate at which specific events occur and to take an action in dependence on the determined rate; and
    use an output of a clock of the marking apparatus to perform a time-based action or calculation;
  a printing arrangement for applying the generated message to the article; and
  a data input for receiving data from a source external to said apparatus, wherein execution of the operational behaviour script by the processor is dependent on data received via the data input; and
a data source external to said marking apparatus and arranged to provide data to the marking apparatus via the data input of the marking apparatus for use by the processor of the marking apparatus when executing the operational behaviour script.

19. A system according to claim 18, in which the data source comprises a sensor for determining one or more properties of the article.

20. A method of using a marking apparatus to apply a message to an article, wherein the apparatus comprises a processor and a printing arrangement for applying the message to the article, the method comprising:
  the processor generating the message for application to the article;
  the processor controlling the operation of the marking apparatus by, at least in part, executing an operational behaviour script formed using a scripting language, wherein the processor is also arranged to execute a core application to provide default functionality to the marking apparatus, wherein execution of the operational behaviour script controls how and when the message is generated, and wherein the execution of the operational behaviour script does not generate content of the message;
  wherein execution of the operational behaviour script by the processor causes the processor to do one or more of the following:
    control, at least in part, determining that an event or an action has timed-out;
    determine whether a sequence of events has been carried out in a correct order or with correct timing and to take an action in dependence on whether or not the sequence or events has been carried out in the correct order or with the correct timing;
    determine a rate at which specific events occur and to take an action in dependence on the determined rate; and
    use an output of a clock of the marking apparatus to perform a time-based action or calculation; and
  the printing arrangement applying the generated message to the article.

21. The method according to claim 20, wherein executing the operational behaviour script causes the processor to control the printing arrangement.

22. The method according to claim 20, wherein executing the operational behaviour script causes the processor to provide user-configured functionality to the apparatus.

23. The method according to claim 20, in which executing the operational behaviour script controls, at least in part, detection of the article to which the message is to be applied.

24. The method according to claim 20, in which executing the operational behaviour script controls, at least in part, when the processor generates the message for application to the article.

25. The method according to claim 20, in which executing the operational behaviour script controls, at least in part, when the processor generates an alert or a warning.

26. The method according to claim 20, in which executing the operational behaviour script causes the processor to provide data as an output from the apparatus.

27. The method according to claim 20, in which executing the operational behaviour script causes the processor to detect whether or not a specific event has occurred and to take an action in dependence upon whether or not the specific event has occurred.

28. The method according to claim 20, in which the apparatus comprises a buffer, wherein executing the operational behaviour script causes the processor to use data stored in the buffer.

29. The method according to claim 20, in which the apparatus comprises a data input for receiving data from a source external to said apparatus, wherein executing the operational behaviour script causes the processor to use data received via the data input.

30. The method according to claim 29, wherein executing the operational behaviour script causes the processor to use data received via the data input to determine when to apply the message to the article and/or actions to take after applying the message to the article.

31. The method according to claim 20, wherein executing the operational behaviour script causes the processor to determine whether or not present conditions are valid for applying the generated message to the article.

32. The method according to claim 20, comprising selecting one of a plurality of operational behaviour scripts being stored by the apparatus as the operational behaviour script to be executed by the processor.

33. The method according to claim 20, comprising receiving one or more operational behaviour scripts from a source external to said apparatus.

34. The method according to claim 20, in which the operational behaviour script is in a human-readable format, wherein executing the operational behaviour script comprises executing an interpreter for interpreting the human-readable format.

35. The method according to claim 20, in which the operational behaviour script is in a machine-readable format, wherein executing the operational behaviour script comprises executing the machine-readable format.

36. A non-transitory computer readable medium carrying a computer program which, when executed by a marking apparatus, causes the marking apparatus to carry out a method to apply a message to an article, wherein the apparatus comprises a processor and a printing arrangement for applying the message to the article, the method comprising:

the processor generating the message for application to the article;

the processor controlling the operation of the marking apparatus by, at least in part, executing an operational behaviour script formed using a scripting language, wherein the processor is also arranged to execute a core application to provide default functionality to the marking apparatus, wherein execution of the operational behaviour script controls how and when the message is generated, and wherein the execution of the operational behaviour script does not generate content of the message;

wherein execution of the operational behaviour script by the processor causes the processor to do one or more of the following:

control, at least in part, determining that an event or an action has timed-out;

determine whether a sequence of events has been carried out in a correct order or with correct tin and to take an action in dependence on whether or not the sequence of events has been carried out in the correct order or with the correct timing;

determine a rate at which specific events occur and to take an action in dependence on the determined rate; and use an output of a clock of the marking apparatus to perform a time-based action or calculation; and the printing arrangement applying the generated message to the article.

* * * * *